United States Patent

Ralston

[15] 3,661,608

[45] May 9, 1972

[54] COMPOSITIONS FOR USE IN REFRACTORIES

[72] Inventor: Paul H. Ralston, Bethel Park, Pa.

[73] Assignee: Calgon Corporation, Pittsburgh, Pa.

[22] Filed: Aug. 18, 1969

[21] Appl. No.: 851,056

[52] U.S. Cl. .................................106/286, 23/105, 106/39
[51] Int. Cl. .........................................................C08h 17/24
[58] Field of Search .........................106/286, 47, 85; 23/105

[56] References Cited

UNITED STATES PATENTS

| | | | |
|---|---|---|---|
| 3,179,524 | 4/1965 | Hunter | 106/39 |
| 2,375,638 | 5/1945 | Englund | 23/105 |
| 2,324,124 | 7/1943 | Williams | 23/105 |
| 3,310,411 | 3/1967 | Vedder et al | 106/39 R |

*Primary Examiner*—Theodore Morris
*Attorney*—William L. Krayer

[57] ABSTRACT

Compositions comprising $B_2O_3$, $P_2O_5$, $H_2O$ and, typically, alkali metal oxides are disclosed. These compositions are useful as binders for refractory compositions.

1 Claims, No Drawings

COMPOSITIONS FOR USE IN REFRACTORIES

BACKGROUND OF THE INVENTION

Since the discovery of the basic oxygen furnace and other high temperature metallurgical processes, industry has been demanding higher quality refractories. Increased production rates and increased operating temperatures require refractories with improved bonding characteristics.

Chemical bonding of refractories has been practiced for many years. The particular chemical binder used in a given refractory is determined by the composition of the refractory aggregate and the chemical and physical properties of the end product desired. The type of binder is also important because its characteristics help determine the particular usefulness of the end product.

There are two main types of refractory products which derive significant properties from chemical bonding—monolithics and shapes. Shape refractories are usually in the form of bricks which have been chemically bonded by burning at elevated temperatures or curing at relatively low temperatures. The bulk of the bricks are used to construct industrial furnaces such as blast furnaces, open hearth furnaces, cement kilns and electric arc furnaces. The refractory products most frequently associated with chemical bonds are the monolithics. Monolithic refractories include the castables, ramming mixes, mortars, and gunning mixes which are shaped within the furnace. Almost all monolithics have a chemical binder to promote adherence of the refractory material to the furnace wall and to increase temperature strength.

The two principal types of refractory aggregates are acidic and basic. The basic aggregate is usually dead-burned magnesia which is referred to as periclase. Generally, the magnesia aggregate contains a modifying compound which can be dead-burned in admixture or in some cases the components are burned separately and then mixed. For example, the basic refractory aggregate can be straight periclase, mixtures of periclase and burned dolomite, or mixtures of periclase and burned chrome ore. The aggregate can also be a mixture of magnesia and dolomite or magnesia and chrome ore, or magnesia and zircon which have been dead-burned in admixture. The acidic aggregate is usually composed of materials such as calcined fireclay, calcined bauxite, and calcined aluminum oxide. The most common acidic aggregate is a high alumina material made by calcining bauxite. Generally the alumina aggregate also contains a modifying compound which can be calcined with the bauxite or calcined separately and then mixed.

Many different chemical binders have been used in refractory products. Among the principal chemicals used are calcium aluminate, sodium silicate, magnesium sulfate (epsom salt), phosphoric acid, and phosphate salts.

In recent years, phosphate bonding of refractories has gained extensive use in the industry. The phosphate bond imparts two characteristics which are desired in refractory products. First, the phosphate bond provides exceptional strength at room temperature and over the intermediate temperature range of 750° to 2,000° F. Second, the phosphate bonded products are less wetted and attacked by the molten metals and slag found in industrial furnaces. The phosphate bonding agents which have been widely used are the phosphoric acids and the readily soluble alkali metal and ammonium orthophosphates and polyphosphates.

Phosphoric acid is desirable as a source of phosphate because it does not add alkali or alkaline earth metals to the refractory products. Certain concentrations of alkali and alkaline earth metals can form low melting compounds when mixed with refractory aggregates, especially acidic aggregates. These low melting compounds cause a loss in the temperature stability of the refractory product. Even though it is a good source of phosphate for refractory bonding, phosphoric acid has several disadvantages. Phosphoric acid has not been used for bonding alkaline refractory aggregates. It reacts with magnesia to produce excessive heat which changes the moisture of the refractory material to steam and disrupts the structure of the refractory. Phosphoric acid can be used with acidic aggregates; however, acidic refractory compositions containing phosphoric acid have unpredictable and rapid setting characteristics. In addition, refractory compositions containing phosphoric acid are difficult to ship, store, and handle because of their reactivity.

The disadvantages of phosphoric acid have resulted in the trend toward the use of phosphate salts in refractory compositions. Phosphate salts, especially sodium phosphate glasses, have been used in basic refractory products since they do not react vigorously with magnesia. However, phosphate salts also have certain disadvantages. Certain alkali and alkaline earth metal phosphate salts introduce too much unwanted alkalinity into the acidic refractory composition causing a corresponding loss of temperature stability. Gunning mixes containing soluble polyphosphate glasses have narrow water ranges and high rebound losses. Ammonium phosphate has been tried as a source of liquid phosphate but ammonium phosphate is objectionable since it has a high ammonia release upon heating.

It is therefore an object of this invention to provide a novel phosphate bonding compound which is an improvement over the prior art.

SUMMARY OF THE INVENTION

This invention provides a novel phosphate binder for refractory products which has many of the desirable properties of phosphoric acid without its disadvantages. This invention also provides a novel phosphate binder which is equivalent to the polyphosphate salts but does not have their disadvantages. The binder of this invention can be used in acidic or basic refractories. It is very stable and easy to transport and store. The binder has controllable setting characteristics and a wide water range. The amount of alkali added by the new binder can also be regulated.

I have invented novel phosphate compositions which are useful in refractory bonding. My invention includes compositions containing $B_2O_3$, $P_2O_5$, $H_2O$, and $M_2O$ where M is an alkali or alkaline earth metal oxide. These compositions may be physical mixtures, low temperature reaction products, or fused products. In any case, the water ($H_2O$) component is an essential constituent since solubility characteristics are adversely influenced when the $H_2O$ content of the bonding composition is absent or lower than specified. The compositions of my invention may be expressed in terms of mole percents of various oxides as follows:

| Metal Oxides | 1.6 – 61.0% |
|---|---|
| $P_2O_5$ | 23.6 – 56.4% |
| $B_2O_3$ | 1.0 – 37.7% |
| $H_2O$ | 0.6 – 53.4% | where "metal oxides" are alkali metal or alkaline earth metal oxides, referred to elsewhere herein, unless otherwise stated, as $M_2O$.

When the composition of my invention is a physical mixture, it may be expressed as a molar ratio of the different phosphates as follows:

a. From 5 to 95 mole percent $B_2O_3 \cdot P_2O_5 \cdot xH_2O$ where $x$ is from 0.6 to 2.5, and b. From 5 to 95 mole percent molecularly dehydrated phosphate having a molar formula of $M_2O:P_2O_5$ of from 0.7:1 to 1.67:1

Preferably the compositions of my invention will contain the following:

1. a. From 60 to 95 mole percent $B_2O_3 \cdot P_2O_5 \cdot xH_2O$ where x is from 0.6 to 2.5, and
   b. From 5 to 40 mole percent molecularly dehydrated phosphate having a molar formula of $M_2O:P_2O_5$ of from 0.7:1 to 1.67:1, or when expressed in terms of mole percents of the various oxides
2. a. 1 mole $B_2O_3$
   b. 1.05 to 1.40 moles $P_2O_5$
   c. 0.6 to 2.5 moles $H_2O$
   d. 0.1 to 0.7 moles $M_2O$ when M is Na or K The compositions of my invention may be prepared by any of the various methods known to one skilled in the art. The following examples are illustrative of their preparation but are not to be construed as limiting the same.

EXAMPLE I

A $B_2O_3 \cdot P_2O_5 \cdot xH_2O$ composition was prepared in the following manner. First, 29 parts by weight of 105 percent phosphoric acid ($H_3PO_4$) were placed in the reactor and heated to 185° to 195° F. Then 43.3 parts by weight boric acid ($H_3BO_3$) were added and the mixture stirred until homogeneous. Finally, 27.7 parts by weight phosphorous pentoxide ($P_2O_5$) were added at a controlled rate. During the addition of the $P_2O_5$, the reaction became exothermic and water was released. The temperature of the reaction and the amount of water driven off was controlled by the rate of addition of the $P_2O_5$. When the addition of the $P_2O_5$ was complete, the product was cooled and pulverized. The resulting compound was a hydrated borophosphate product ($B_2O_3 \cdot P_2O_5 \cdot xH_2O$) containing about 6 to 10 weight percent water.

A $B_2O_3 \cdot P_2O_5 \cdot xH_2O$ product was also prepared by reacting 61.8 parts by weight $H_3BO_3$ and 93.4 parts by weight of 105% ($H_3PO_4$) and drying at 120° C. A similar product was also prepared by mixing 12.4 parts by weight $H_3BO_3$ and 14.2 parts by weight $P_2O_5$ and initiating the reaction by adding a few parts of water.

The scope of this invention is independent of the method used for preparing the $B_2O_3 \cdot P_2O_5 \cdot xH_2O$.

EXAMPLE II

Physical mixtures of $B_2O_3 \cdot P_2O_5 \cdot 1.25H_2O$ and $1.1Na_2O:1 P_2O_5$ were prepared by dry blending the two products in various weight percents. Three compositions of the various mixtures are shown below.

| Blend No. | Weight Percent $B_2O_3 \cdot P_2O_5 \cdot 1.25H_2O$ | Weight Percent $1.1Na_2O:1P_2O_5$ |
|---|---|---|
| 1 | 95 | 5 |
| 2 | 84 | 16 |
| 3 | 25 | 75 |

These mixtures were very stable and readily soluble. They were shown to be a good source of phosphate binders for refractory compositions.

EXAMPLE III

A glassy phosphate was prepared by heating 15 parts by weight of $B_2O_3 \cdot P_2O_5 \cdot 1.25H_2O$ and 85 parts by weight of sodium polyphosphate ($1.1Na_2O:1.0P_2O_5$) at 1,000° C until homogeneous. The reaction mixture was then rapidly cooled and a soluble glassy phosphate product was obtained.

EXAMPLE IV 44.1 parts by weight of 105 percent $H_3PO_4$ were heated to 100° C and 29.2 parts by weight of $H_3BO_3$ and 50 parts by weight of sodium polyphosphate ($1.1Na_2O:1P_2O_5$) were added with mixing. When uniform, the reaction product was dried at 150° C.

EXAMPLE V 44.1 parts by weight of 105 percent $H_3PO_4$ were heated to 100° C. and 29.2 parts by weight of $H_3BO_3$ were added with agitation. When the mixture became uniform, 50 parts by weight of potassium tripolyphosphate were added ($K_5P_3O_{10}$). The mixture was agitated until uniform and then cooled and dried at 120° C.

EXAMPLE VI 6.6 parts by weight of sodium carbonate ($Na_2CO_3$) were added to 23.4 parts by weight of 105 percent $H_3PO_4$ and the mixture heated to 300° C. for 30 minutes. Then 4 parts by weight of $H_3BO_3$ and 10 parts by weight of water were added and the mixture heated for 10 minutes at 300° C. The reaction mixture was then rapidly chilled forming a readily soluble phosphate product.

EXAMPLE VII 6.6 parts by weight of sodium carbonate ($Na_2CO_3$) were added to 23.4 parts by weight of 105 percent $H_3PO_4$ and the mixture heated to 275° C. Then 4 parts of $B_2O_3 \cdot P_2O_5 \cdot 1.25H_2O$ were added and the mixture held for 30 minutes at 275° C. The reaction mixture was then rapidly chilled and a glassy phosphate product was obtained.

EXAMPLE VIII 22.2 parts by weight of $Na_2H_2P_2O_7$ and 12.4 parts by weight of $H_3BO_3$ were mixed together and heated at 1,000° C. until the reactants were fused. The melt was then rapidly cooled to form a glassy phosphate composition.

I claim:

1. A $B_2O_3 \cdot P_2O_5 \cdot H_2O$ metal oxide low temperature reaction product made between 100° and 300° C. useful in refractory mixtures to increase bond strength consisting essentially of
    a. 1 mole of $B_2O_3$
    b. 1.05 to 1.4 moles of $P_2O_5$
    c. 0.6 to 2.5 moles of $H_2O$
    d. 0.1 to 0.7 mole metal oxide selected from the group consisting of alkali metal oxides and alkaline earth metal oxides.

* * * * *